(12) United States Patent
Fritz et al.

(10) Patent No.: US 7,520,272 B2
(45) Date of Patent: Apr. 21, 2009

(54) FUEL INJECTOR

(75) Inventors: Jassin Fritz, München (DE); Gabor Ast, Garching (DE)

(73) Assignee: General Electric Company, Niskayuna, NY (US)

(*) Notice: Subject to any disclaimer, the term of this patent is extended or adjusted under 35 U.S.C. 154(b) by 487 days.

(21) Appl. No.: 11/338,473

(22) Filed: Jan. 24, 2006

(65) Prior Publication Data

US 2007/0170283 A1 Jul. 26, 2007

(51) Int. Cl.
*F02B 43/00* (2006.01)
*F02M 23/00* (2006.01)
*F02M 29/06* (2006.01)

(52) U.S. Cl. .................. 123/527; 123/531; 123/590

(58) Field of Classification Search ......... 123/590–593, 123/525–527, 585, 467, 470, 531; 239/533.2, 239/548, 554, 559, 567, 568, 417.5
See application file for complete search history.

(56) References Cited

U.S. PATENT DOCUMENTS

| | | | |
|---|---|---|---|
| 4,318,386 A | 3/1982 | Showalter et al. | |
| 5,109,671 A * | 5/1992 | Haasis | 60/804 |
| 5,638,682 A | 6/1997 | Joshi et al. | |
| 5,675,971 A * | 10/1997 | Angel et al. | 60/746 |
| 5,791,892 A * | 8/1998 | Dobbeling et al. | 431/284 |
| 5,791,894 A * | 8/1998 | Dobbeling et al. | 431/350 |
| 6,059,560 A * | 5/2000 | Richards et al. | 431/1 |
| 6,263,660 B1 | 7/2001 | Lawlor | |
| 6,360,776 B1 * | 3/2002 | McCormick et al. | 137/896 |
| 6,474,569 B1 * | 11/2002 | Brundish et al. | 239/406 |
| 6,945,478 B2 | 9/2005 | Spencer | |
| 7,188,612 B2 * | 3/2007 | Hattori | 123/494 |
| 7,360,363 B2 * | 4/2008 | Mandai et al. | 60/737 |
| 2002/0162333 A1 * | 11/2002 | Zelina | 60/776 |
| 2005/0034444 A1 | 2/2005 | Sanders | |
| 2007/0119985 A1 * | 5/2007 | Ranganathan et al. | 239/398 |
| 2007/0204839 A1 * | 9/2007 | Rock et al. | 123/526 |
| 2008/0060361 A1 * | 3/2008 | Morrison et al. | 60/768 |
| 2008/0148736 A1 * | 6/2008 | Ishizaka et al. | 60/737 |

* cited by examiner

*Primary Examiner*—Hai H Huynh
(74) *Attorney, Agent, or Firm*—Francis T. Coppa

(57) ABSTRACT

A fuel injector (10) for an internal combustion engine (88) includes a centerbody (12) and a casing (14) disposed radially outward of the centerbody to define an annular mixing section (16) between the centerbody and the casing. The fuel injector also includes an air inlet (e.g., 18) of the mixing section for injecting a first portion (22) of combustion air into the mixing section. A fuel inlet (32) is disposed in the centerbody for injecting fuel (34) into the mixing section. A fuel conduit (48) disposed in the centerbody conducts the fuel to the fuel inlet and a valve (50) disposed in the fuel conduit selectively controls fuel injection into the mixing section. The valve may be positioned sufficiently close to the fuel inlet to provide the desired accurate timed injection. The injector also includes an outlet (19) of the mixing section for discharging a fuel/air mixture (60).

45 Claims, 3 Drawing Sheets

FUEL INJECTOR

FIELD OF THE INVENTION

Embodiments of the present invention are generally related to fuel injectors, and, more particularly, to a fuel injector having vortex generators for premixing an injected amount of fuel with an oxidizer for injection into an internal combustion engine.

BACKGROUND OF THE INVENTION

In Otto-type gas engines, fuel and combustion air are premixed upstream of the cylinders of the engine using a venturi mixer or another mixing and injection device. In order to maximize the fuel/air mixture homogeneity and to allow a low pressure fuel supply, the fuel is often injected upstream of the compressor. Such mixing and injection concepts result in relatively large volumes of ignitable mixture outside of the combustion chamber and do not allow the control of the fuel injection timing to avoid flashback. Both controlled injection and small ignitable mixture volumes upstream of the cylinder are especially important for fuels with high flashback risk such as hydrogen. Port injection techniques are used to provide appropriate timing of fuel injection to avoid flashback, but at a cost of reducing the mixing quality. The reduced mixing quality may lead to increased emissions, reduced power and a restricted operating range of the engine. Accordingly, it is desired to improve mixing and injection of fuels for internal combustion engines to achieve high power density, efficient operation, and reduced emissions.

DETAILED DESCRIPTION OF THE INVENTION

Embodiments of the present invention include a fuel injector having axial and radial air injection into a mixing section disposed around a centerbody. The centerbody may include a fuel injection valve for injecting fuel into the mixing section, advantageously allowing timed fuel injection and metering, for example, to minimize a flashback risk. The mixing section may include a vortex generator, for example, a plurality of annularly spaced apart vanes formed axially along the centerbody, for producing vortexes with the radially injected air to provide improved mixing of air and fuel in the mixing section. Embodiments of the fuel injector provide improved mixture homogeneity over conventional fuel injectors while providing improved flashback resistance, reduced fuel injection cycle to cycle variations, increased power density, and lower emissions.

Figure 1:
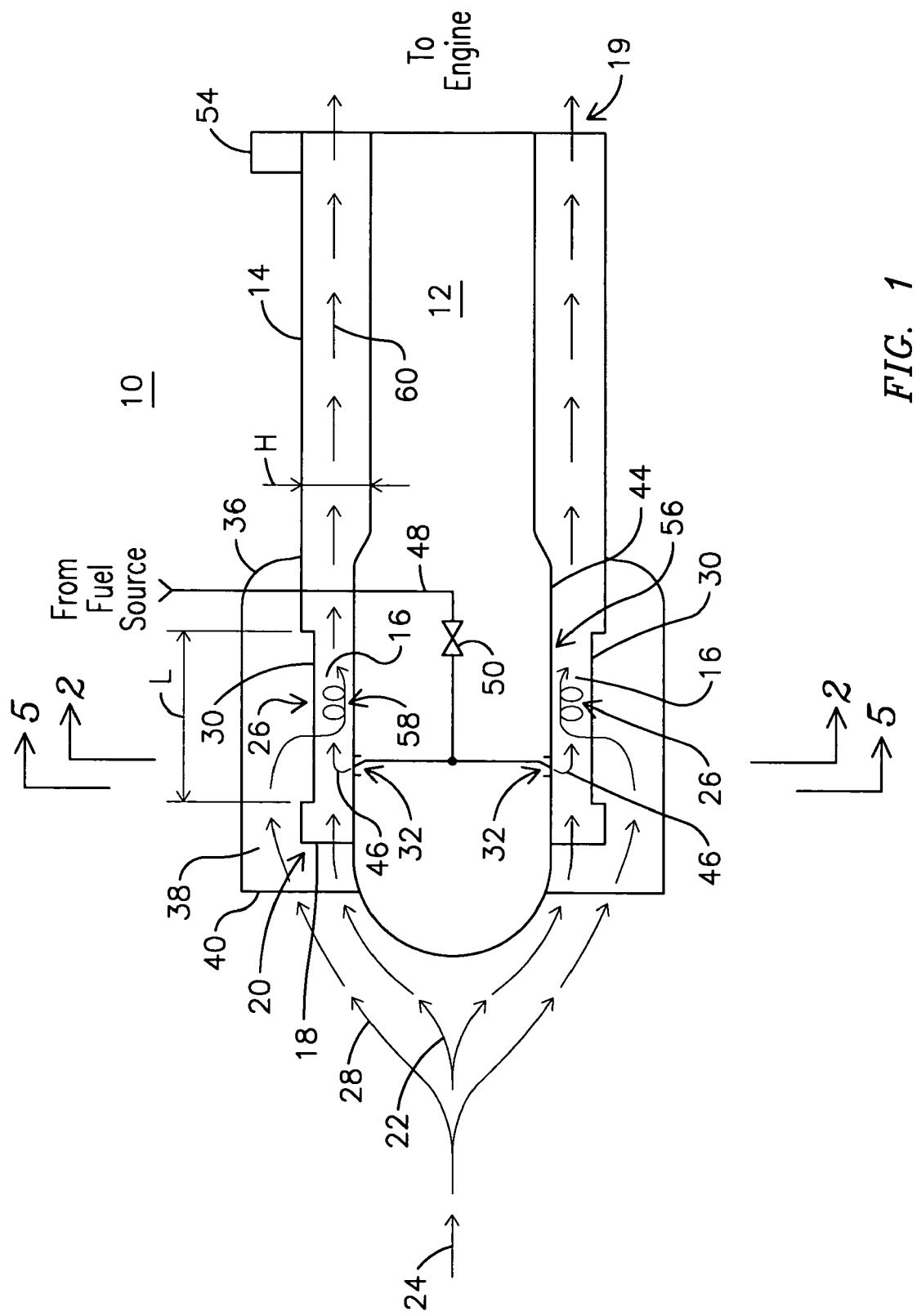
FIG. 1 shows a cross sectional schematic view of an example embodiment of an improved fuel injector.
Figure 5:
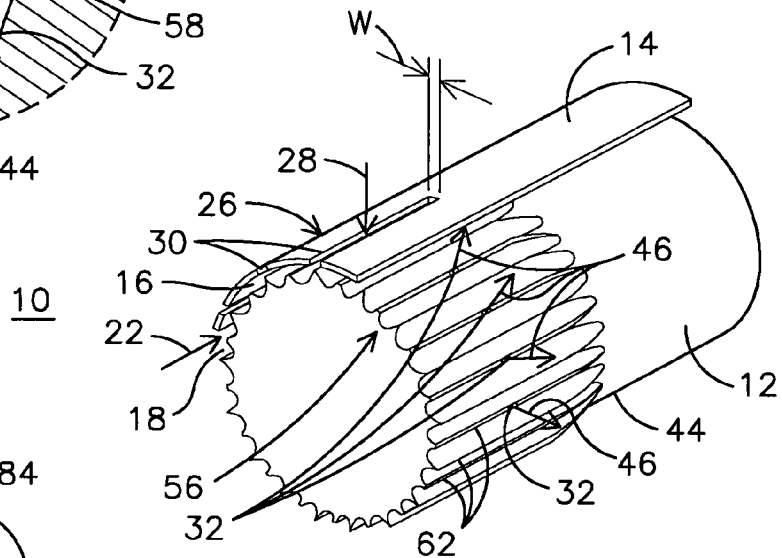
FIG. 5 shows a partial perspective view of the example embodiment of the fuel injector of FIG. 1 viewed along line 5-5.

FIG. 1 shows cross sectional schematic view of an example embodiment of the improved fuel injector 10 and FIG. 5 shows a partial perspective view of the example embodiment of the fuel injector 10 of FIG. 1 viewed along line 5-5. The fuel injector 10 may include a centerbody 12 and a casing 14 disposed radially outward of the centerbody 12. The centerbody 12 and the casing 14 define an annular mixing section 16 therebetween. The injector 10 may further include an axial air inlet 18 at an upstream end 20 of the mixing section 16 for axially injecting a first portion 22 of an oxidizer, such as combustion air 24, into the mixing section 16. The fuel injector 10 may further include a radial air inlet 26 disposed in the casing 14 for radially injecting a second portion 28 of combustion air 24 into the mixing section 16. In an embodiment of the invention, the radial air inlet 26 may include a plurality of annularly spaced apart slots 30. A second casing 36 may be disposed radially outward of the casing 14 to define a plenum 38 for receiving the second portion 28 of the combustion air 24 at an inlet 40 of the plenum 38 and conducting the second portion 28 of the combustion air 24 to the radial air inlet 26. In an aspect of the invention, an area ratio of the axial air inlet 16 and the radial air inlet 26 is configured to achieve a desired flow configuration. For example, a mixing section geometry, such as a height, H, of the mixing section 16, may be adjusted with respect to a geometry of the slots 30 of the radial inlet 26, such as a slot length L and/or slot width, W, to achieve a desired flow configuration and mixing effect. In yet another embodiment of the invention, the combustion air 24, or portions thereof, provided to the injector 10 may be premixed with fuel upstream of the fuel injector 10 to provide the premixed fuel/air mixture at the axial and/or radial air inlets 18, 26.

Figure 2:
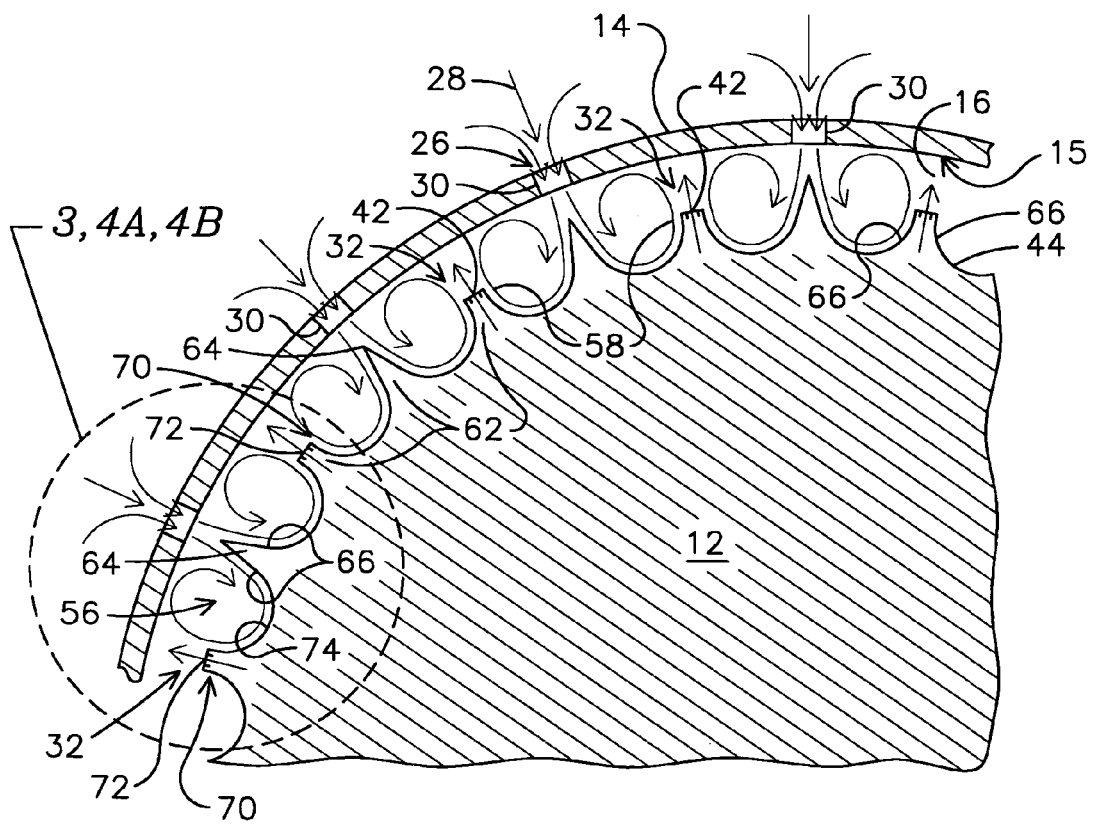
FIG. 2 shows a partial cross sectional view of the example embodiment of the fuel injector of FIG. 1 taken along line 2-2.

The fuel injector 10 may also include a fuel inlet 32 disposed in the centerbody 12 downstream of the axial air inlet 18 for injecting a fuel, such as natural gas, hydrogen, biogas, or syngas, into the mixing section 16. As can be seen in FIG. 2, the fuel inlet 32 may be angularly displaced with respect to the radial air inlet 26. In an embodiment, the fuel inlet 32 may comprise a plurality of annularly spaced apart openings 42 disposed in an outer surface 44 of the centerbody 12. The openings 42 may be angularly displaced with respect to the slots 30 of the radial air inlet 26.

As shown in FIG. 1, fuel 46 may be selectively provided to the fuel inlet 32 by a fuel conduit 48 disposed within the centerbody 12 for conducting the fuel 46 to the fuel inlet 32. A valve 50 may be disposed in the fuel conduit 48 within the centerbody 12 for selectively controlling fuel injection into the mixing section 16. For example, the valve 50 may control an amount of fuel delivered via the annularly spaced apart openings 42. The valve 50 may include a magnetic valve, piezoelectric valve or other type of valve that is variably controllable to provide a variable flow of fuel at desired times. In an aspect of the invention, the valve 50 is disposed in the fuel conduit 48 sufficiently close to the fuel inlet 32 to reduce a fuel volume between the fuel inlet 42 and the valve 50, such as a valve seat of the valve 50 to provide desired fuel metering. In another embodiment, the valve 50 may be disposed outside the centerbody 12.

The fuel inlet 32 may be configured to inject the fuel 46 with an axial velocity component directed upstream, such as by configuring the fuel inlet 32 to be angled to point upstream.

In another embodiment, the fuel inlet 32 may be configured to inject the fuel 46 at about 90 degrees with respect to an axial flow direction of the first portion 22. The fuel injector 10 may further include a flashback detector 54 disposed proximate the outlet 19 of the fuel injector 10 for sensing a flashback event into the inlet port. The flashback detector 54 may directly or indirectly control an operation of the valve 50, for example, when a flashback condition is sensed, to immediately shut off the fuel supply or operate the valve 50 to achieve desired flashback control, such as by shutting off the valve for one or more operating cycles.

Figure 6:
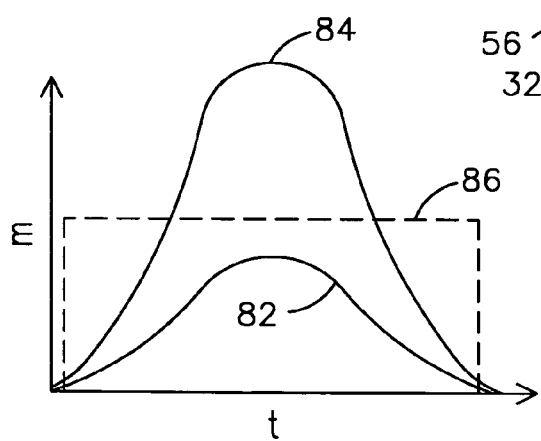
FIG. 6 shows an example graph of mass flow versus time for fuel and air to achieve a desired constant equivalence ratio.

In yet another aspect, the valve 50 may be variably controlled to provide unsteady metering of the fuel 46 into the mixing section 16, for example, to achieve a desired constant equivalence ratio (EQR) of the fuel air mixture during injection. FIG. 6 shows an example graph of mass flow versus time depicting a desired time dependent fuel mass flow 82 compared to an time varying air mass flow 84 to achieve a desired constant equivalence ratio 86. During a fuel injection period, the valve 50 may be operated responsive to a sensed, or predetermined expected value of, a time varying air mass flow of the combustion air, or portions thereof, proximate the injector 10 to vary an opening position of the valve 50 to achieve a time varying fuel amount delivered into the mixing section 16. Accordingly, an EQR of the fuel/air mixture 60 may be maintained with varying air mass flows to provide improved combustion performance.

In embodiments shown in FIGS. 1, 2, 3, and 5, a vortex generator 56 may be disposed in the mixing section 16, for producing vortices, such as longitudinal vortices 58, with the second portion 28 of the combustion air 24. Advantageously, the vortex generator 56 promotes mixing of the injected fuel 46 with the first 22 and second portions 28 of the injected combustion air 24 to generate a homogenous fuel/air mixture 60 at the outlet 19 of the fuel injector 10. The vortices 58 provide improved mixing quality within a relatively short mixing length to produce a relatively small ignitable mixture volume that helps to limit flashback risk.

In an embodiment, the vortex generator 56 may include a plurality of annularly spaced apart, axially extending vanes 62 formed in the outer surface 44 of the centerbody 12. The vanes 62 may extend along at least an upstream portion of the centerbody 12 and may be directed radially outward from the centerbody 12 at least partially into the mixing section 16. In an aspect of the invention, the vanes 62 may comprise curved lateral surfaces 66. The vanes 62 also may comprise a first plurality of peaked portions 64 aligned with respective slots 30 of the radial inlet 26 so that the second portion 28 of the combustion air 24 injected radially inward is split by the peaked portions 64 to generate respective counter-rotating vortices 58 with the second portion 28 along respective curved lateral surfaces 66 of the vane 62.

The vortex generator 56 may also include a second plurality of peaked portions 70 annularly interposed between the first plurality of peaked portions 64, for example, so that the second plurality of peaked portions 70 are angularly displaced from respective slots 30 of the radial inlet 26. The peaked portions 70 may extend axially along at least an upstream portion of the centerbody 12 and may be directed radially outward from the centerbody 12 at least partially into the mixing section 16. In an aspect to the invention, the peaked portions 70 may have a flattened top 72. In another aspect, the fuel inlet 32 may be disposed in the top 72 of peaked portion 70. A curved trough 74 may be formed in the outer surface 44 of the centerbody 12 between peaked portions 64, 70 and the vanes 62 as part of the vortex generator 56.

Figure 3:
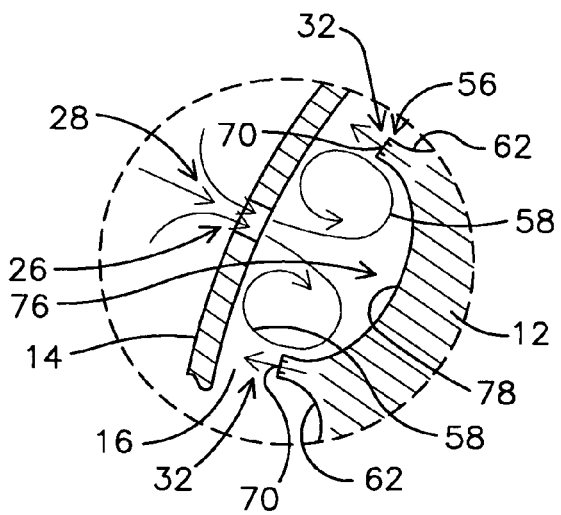
FIG. 3 shows a partial cross sectional view of another example embodiment of the fuel injector of FIG. 1 taken along line 2-2.

In another embodiment depicted in FIG. 3, the vortex generator 56 may include axially extending vanes 62 including peaked portions 70 angularly displaced from respective slots 30 of the radial inlet 26. The vanes 62 may define an axially extending trough 76 formed in the surface 44 of the centerbody 12 between the peaked portions 70. A center 78 of the trough 76 may be angularly aligned with the radial air inlet 26 effective to generate counter-rotating vortices 58 with the second portion 28 of the air 24 injected at the radial inlet 26 and to redirect the second portion 28 towards spaced apart fuel inlets 32 disposed in peaked portions 70 between respective troughs 76.

Figure 4A:
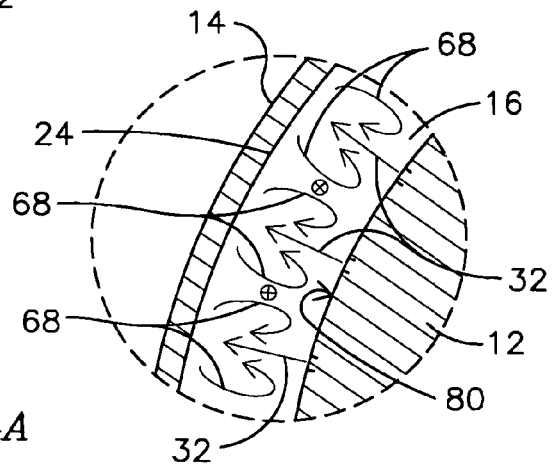
FIG. 4A shows a partial cross sectional view of another example embodiment of the fuel injector of FIG. 1 taken along line 2-2.

In yet another embodiment depicted in FIG. 4A, the centerbody 12 may include a relatively smooth surface portion 80 and may be configured for receiving axially injected combustion air 24 (shown flowing into the page by the crossed circle symbol) without radial air injection. Counter-rotating vortices 68 may be generated by the interaction of the axially injected combustion air 24 and the fuel radially injected into the mixing section 16 from annularly spaced apart fuel inlet 32. The fuel inlet 32 may be angularly oriented to point upstream. Advantageously, this configuration provides minimal pressure loss while still promoting mixing.

Figure 4B:
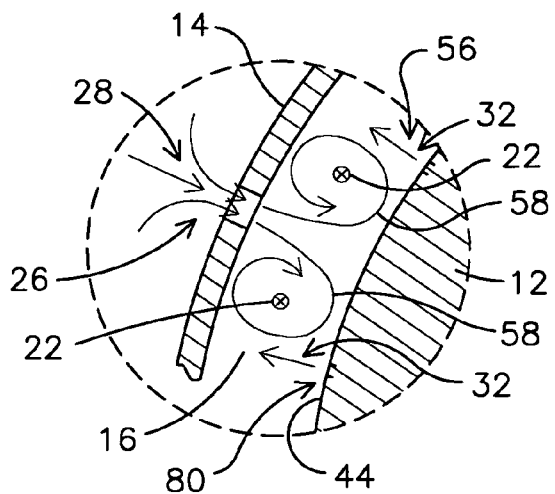
FIG. 4B shows a partial cross sectional view of another example embodiment of the fuel injector of FIG. 1 taken along line 2-2.

In another embodiment depicted in FIG. 4B, the centerbody 12 may include a relatively smooth surface portion 80 and may be configured for receiving axially injected first portion 22 and radially injected second portion 28 of the combustion air 24. Annularly spaced apart fuel inlets 32 may be angularly displaced from the radial air inlet 26. The second portion 28 radially injected into the mixing section 56 generates counter rotating longitudinal vortices 58 axially extending along the centerbody 12 to promote mixing of air 24 with the radially injected fuel.

The embodiments of the vortex generators 56 described above are examples only and any desired geometry and/or arrangement of vortex generating structures, for example, disposed at the inner surface 15 of the casing 14 and/or outer surface 80 of the centerbody 12 may be used to achieve a desired level of mixing quality. The vortex generators 56 advantageously promote intense mixing and homogenization the mixture over a relatively short mixing length. As a result of the vortex assisted mixing, an injected fuel momentum may be relatively low and may be varied without having a significant influence on the homogeneity. In addition, because the valve 50 is mounted in the fuel conduit 48 within the centerbody 12, a relatively small volume between the valve 50 and the fuel inlet 32 helps to ensure accurate metering and enables quick fuel flow shutoff when flashback is detected.

Figure 7:
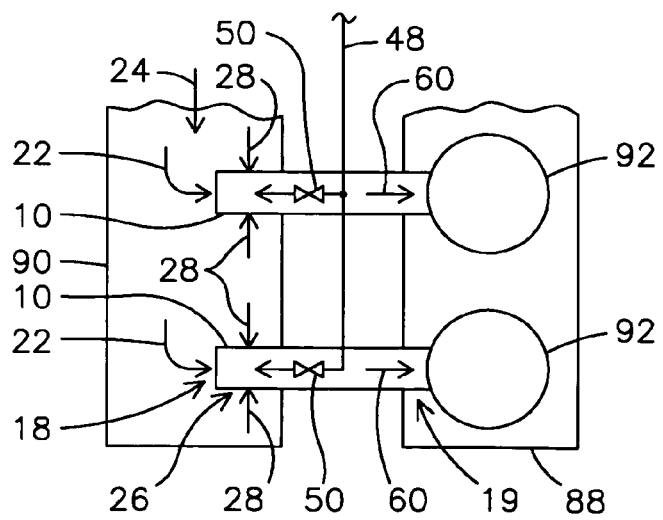
FIG. 7 shows a schematic view of an injection system for an internal combustion engine including an example embodiment of an improved fuel injector.

In an aspect of the invention, the fuel injector 10 may be made retro-fitable to existing inlet ports of internal combustion engines and may be used for a variety of fuels, such as natural gas, syngas, biogas, or hydrogen, and especially for applications where safe combustion and mixture homogeneity are important. For example, as shown in FIG. 7, the fuel injector 10 may be fitted to an internal combustion engine 88 so that the axial inlet 18 and the radial inlet 26 may be in communication with a manifold 90 of an internal combustion engine 88 for receiving combustion air 24 or a premixed fuel/air mixture. The outlet 19 of the fuel injector 10 may be in communication with one or more cylinders 92 of the engine to provide a homogenous fuel/air mixture resulting in improved engine operation.

While certain embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A fuel injector for an internal combustion engine comprising:
   a centerbody;
   a first casing disposed radially outward of the centerbody to define an annular mixing section between the centerbody and the first casing;
   an axial air inlet at an upstream end of the mixing section for axially injecting a first portion of combustion air into the mixing section;
   a radial air inlet disposed in the first casing for radially injecting a second portion of combustion air into the mixing section;
   a fuel inlet disposed in the centerbody downstream of the axial air inlet for injecting fuel into the mixing section; and
   a vortex generator disposed in the mixing section for producing axially extending vortices with the second portion of the combustion air radially injected into the mixing section to promote mixing of the injected fuel with the first and second portions of the injected combustion air to generate a fuel/air mixture at an outlet of the fuel injector.

2. The fuel injector of claim 1, wherein the fuel inlet is configured to inject the fuel with an axial velocity component directed upstream.

3. The fuel injector of claim 1, wherein the fuel inlet is angularly displaced with respect to the radial air inlet.

4. The fuel injector of claim 1, further comprising a second casing to define a plenum for receiving the second portion of the combustion air and for conducting the second portion of the combustion air to the radial air inlet.

5. The fuel injector of claim 1, further comprising a fuel conduit disposed in the centerbody for conducting the fuel to the fuel inlet.

6. The fuel injector of claim 5, further comprising a valve disposed in the fuel conduit for selectively controlling fuel injection into the mixing section.

7. The fuel injector of claim 6, wherein the valve is operable responsive to a sensed mass flow of the combustion air to achieve a desired constant equivalence ratio of a resulting fuel/air mixture generated during an injection cycle.

8. The fuel injector of claim 6, wherein the valve is operable responsive to a predetermined, time varying mass flow of the combustion air to achieve a desired constant equivalence ratio of a resulting fuel/air mixture generated during an injection cycle.

9. A method of controlling a fuel/air mixing operation of the fuel injector of claim 6 comprising controlling an opening position of the valve responsive to a time varying mass flow of the combustion air to provide a variable fuel amount delivered into the mixing section during a fuel injection cycle effective to maintain a desired equivalence ratio of the fuel/air mixture.

10. The fuel injector of claim 1, wherein an area ratio of the axial air inlet and the radial air inlet is configured to achieve a desired flow configuration and mixing effect.

11. The fuel injector of claim 1, wherein the radial inlet comprises a plurality of annularly spaced apart slots axially extending in at least a portion of the first casing.

12. The fuel injector of claim 11, wherein the vortex generator comprises a plurality of annularly spaced apart vanes formed in an outer surface of the centerbody.

13. The fuel injector of claim 12, wherein the vanes comprise curved lateral surfaces.

14. The fuel injector of claim 12, wherein the vanes extend along at least an axial portion of the centerbody and are directed radially outward from the centerbody at least partially into the mixing section.

15. The fuel injector of claim 14, wherein the vanes comprise a first plurality of peaked portions aligned with respective slots of the radial inlet so that the radially injected air is split by the peaked portions to generate respective counter-rotating vortices with the radially injected air.

16. The fuel injector of claim 15, wherein the vanes comprise a second plurality of peaked portions angularly displaced with respect to the slots of the radial air inlet.

17. The fuel injector of claim 16, wherein fuel inlets are disposed in the second plurality of peaked portions.

18. The fuel injector of claim 17, wherein the curved lateral surfaces of the vanes are configured to redirect the radially injected second portion of combustion air at the first plurality of peaked portions towards the fuel inlets disposed in the second plurality of peaked portions to enhance mixing of the combustion air with the injected fuel.

19. The fuel injector of claim 11, wherein the vortex generator comprises a plurality of annularly spaced apart vanes formed in an outer surface of the centerbody and extending along at least an axial portion of the centerbody and directed radially outward from the centerbody at least partially into the mixing section, the vanes being angularly displaced with respect to the slots of the radial air inlet.

20. The fuel injector of claim 19, wherein fuel inlets are disposed in peaked portions of the vanes.

21. The fuel injector of claim 19, wherein the vanes comprise curved lateral surfaces.

22. The fuel injector of claim 21, wherein the curved lateral surfaces of adjacent vanes define an axially extending trough therebetween, a center of the trough being angularly aligned with the slots of the radial air inlet effective to generate counter-rotating vortices with the second portion of the air injected at the radial air inlet and to redirect the radially injected air towards spaced apart fuel inlets disposed in peaked portions of the vanes.

23. The fuel injector of claim 1, wherein the vortex generator comprises a surface portion axially extending along the centerbody between spaced apart fuel inlets, the fuel inlets being angularly displaced with respect to the radial air inlet.

24. The fuel injector of claim 1, wherein the fuel comprises a gaseous fuel.

25. The fuel injector of claim 24, wherein the gaseous fuel is hydrogen, natural gas, syngas, or biogas.

26. The fuel injector of claim 1, wherein a premixed fuel/air mixture is provided to the axial and radial air inlets.

27. An internal combustion engine comprising the fuel injector of claim 1.

28. A fuel injector for an internal combustion engine comprising:
   a centerbody;
   a casing disposed radially outward of the centerbody to define an annular mixing section between the centerbody and the casing;
   an axial air inlet at an upstream end of the mixing section for axially injecting a first portion of combustion air into the mixing section;
   a radial air inlet disposed in the casing for radially injecting a second portion of combustion air into the mixing section;
   a fuel inlet disposed in the centerbody downstream of the axial air inlet for injecting fuel into the mixing section;
   a fuel conduit disposed in the centerbody for conducting the fuel to the fuel inlet; and a valve disposed in the fuel conduit for selectively controlling fuel injection into the mixing section, the valve being positioned sufficiently close to the fuel inlet to reduce a distance between the valve and fuel inlet.

29. The fuel injector of claim 28, wherein the valve comprises a magnetic valve.

30. The fuel injector of claim 28, wherein the valve comprises a piezoelectric valve.

31. The fuel injector of claim 28, further comprising a flashback detector disposed proximate the outlet for sensing a flashback condition and controlling an operation of the valve when a flashback condition is sensed.

32. The fuel injector of claim 28, wherein the valve is operable responsive to a sensed mass flow of the combustion air to achieve a desired constant equivalence ratio of a resulting fuel/air mixture generated during an injection cycle.

33. The fuel injector of claim 28, wherein the valve is operable responsive to a predetermined, time varying mass flow of the combustion air to achieve a desired constant equivalence ratio of a resulting fuel/air mixture generated during an injection cycle.

34. A fuel injector for an internal combustion engine comprising:
a centerbody;
a casing disposed radially outward of the centerbody to define an annular mixing section between the centerbody and the casing;
an air inlet of the mixing section for injecting at least a first portion of combustion air into the mixing section;
a fuel inlet disposed in the centerbody for injecting fuel into the mixing section;
a fuel conduit for conducting the fuel to the fuel inlet;
a valve disposed in the fuel conduit for selectively controlling fuel injection into the mixing section; and
an outlet of the mixing section for discharging a fuel/air mixture.

35. The fuel injector of claim 34, wherein the air inlet compromises an axial air inlet at an upstream end of the mixing section for axially injecting the at least first portion of combustion air into the mixing section.

36. The fuel injector of claim 35, further comprising a radial air inlet disposed in the casing for radially injecting a second portion of combustion air into the mixing section.

37. The fuel injector of claim 34, wherein the air inlet comprises a radial air inlet disposed in the casing for radially injecting the at least first portion of combustion air into the mixing section.

38. The fuel injector of claim 37, further comprising a vortex generator disposed in the mixing section for producing longitudinal vortices within the first portion of the combustion air radially injected into the mixing section to promote mixing of the injected fuel with the first portion of the injected combustion air to generate the fuel/air mixture.

39. The fuel injector of claim 38, wherein the vortex generator comprises a plurality of annularly spaced apart vanes formed in an outer surface of the centerbody.

40. The fuel Injector of claim 34, wherein a premixed fuel/air mixture is provided to the air inlet.

41. The fuel injector of claim 34, wherein the valve is disposed in the centerbody sufficiently close to the fuel inlet to reduce a fuel volume delivered to the fuel inlet.

42. A method of controlling a fuel/air mixing operation of the fuel injector of claim 34 comprising controlling an opening position of the valve responsive to a time varying mass flow of the combustion air to provide a variable fuel amount delivered into the mixing section during a fuel injection cycle effective to maintain a desired equivalence ratio of the fuel/air mixture.

43. A method of controlling a fuel injector, comprising:
receiving a time varying mass flow of combustion air into the fuel injector; and
controlling an opening position of a fuel valve of the fuel injector responsive to the time varying mass flow of combustion air to provide a variable fuel amount delivered into a fuel/air mixing section of the fuel injector during a fuel injection cycle effective to maintain a desired equivalence ratio of a fuel/air mixture generated by the fuel injector.

44. The method of claim 43, further comprising sensing the time varying mass flow of the combustion air to control the opening position of a fuel valve.

45. The method of claim 43, further comprising predetermining expected values of the time varying mass flow of the combustion air to control the opening position of a fuel valve.

* * * * *

UNITED STATES PATENT AND TRADEMARK OFFICE
CERTIFICATE OF CORRECTION

PATENT NO. : 7,520,272 B2 Page 1 of 1
APPLICATION NO. : 11/338473
DATED : April 21, 2009
INVENTOR(S) : Fritz et al.

It is certified that error appears in the above-identified patent and that said Letters Patent is hereby corrected as shown below:

In Column 6, Line 7, in Claim 15, after "injected" insert -- second portion of combustion --, therefor.

In Column 6, Line 9, in Claim 15, after "injected" insert -- second portion of combustion --, therefor.

In Column 6, Line 36, in Claim 22, delete "the air" and insert -- combustion air --, therefor.

Signed and Sealed this

Fourteenth Day of July, 2009

JOHN DOLL
*Acting Director of the United States Patent and Trademark Office*